Patented Aug. 13, 1946

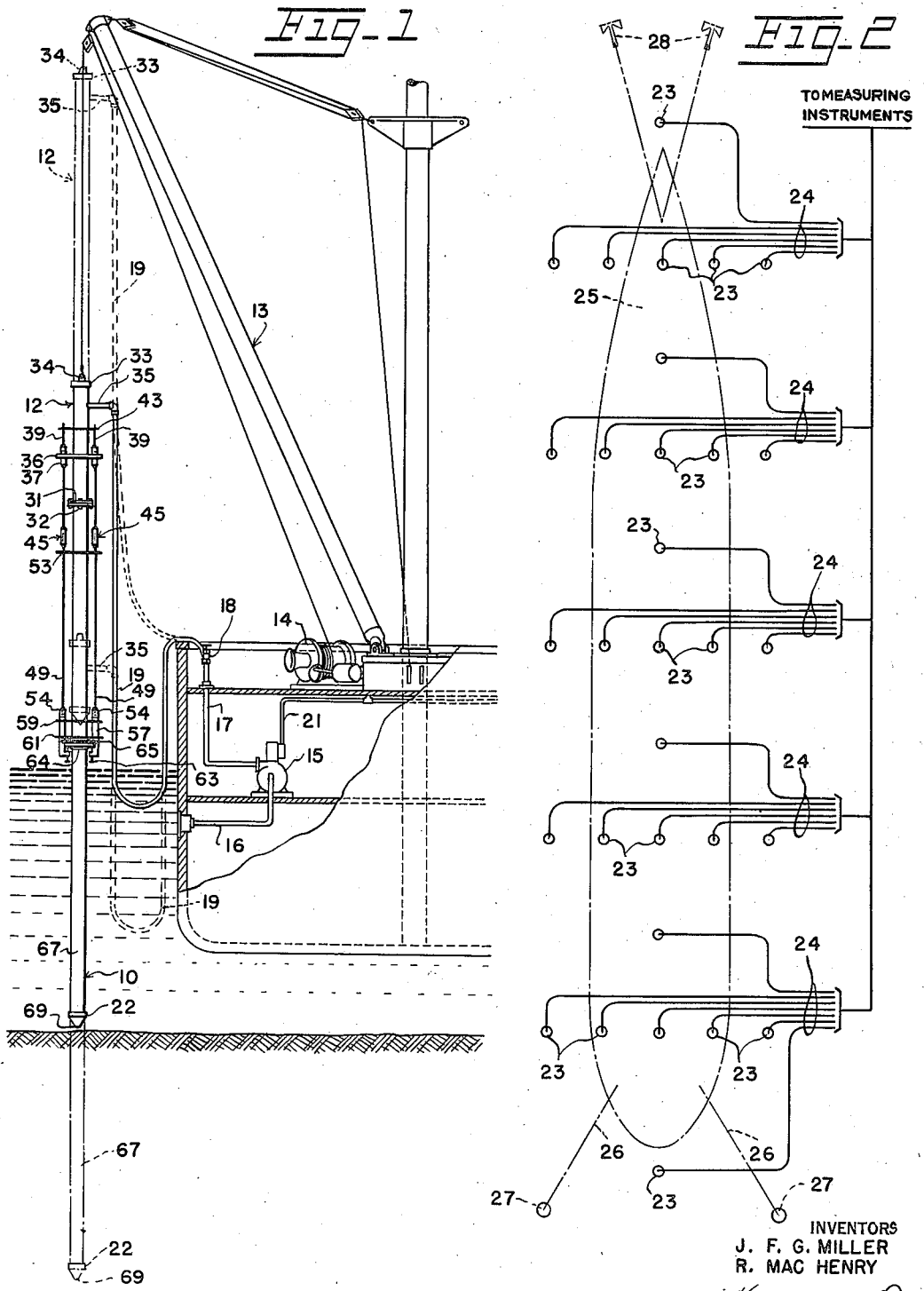

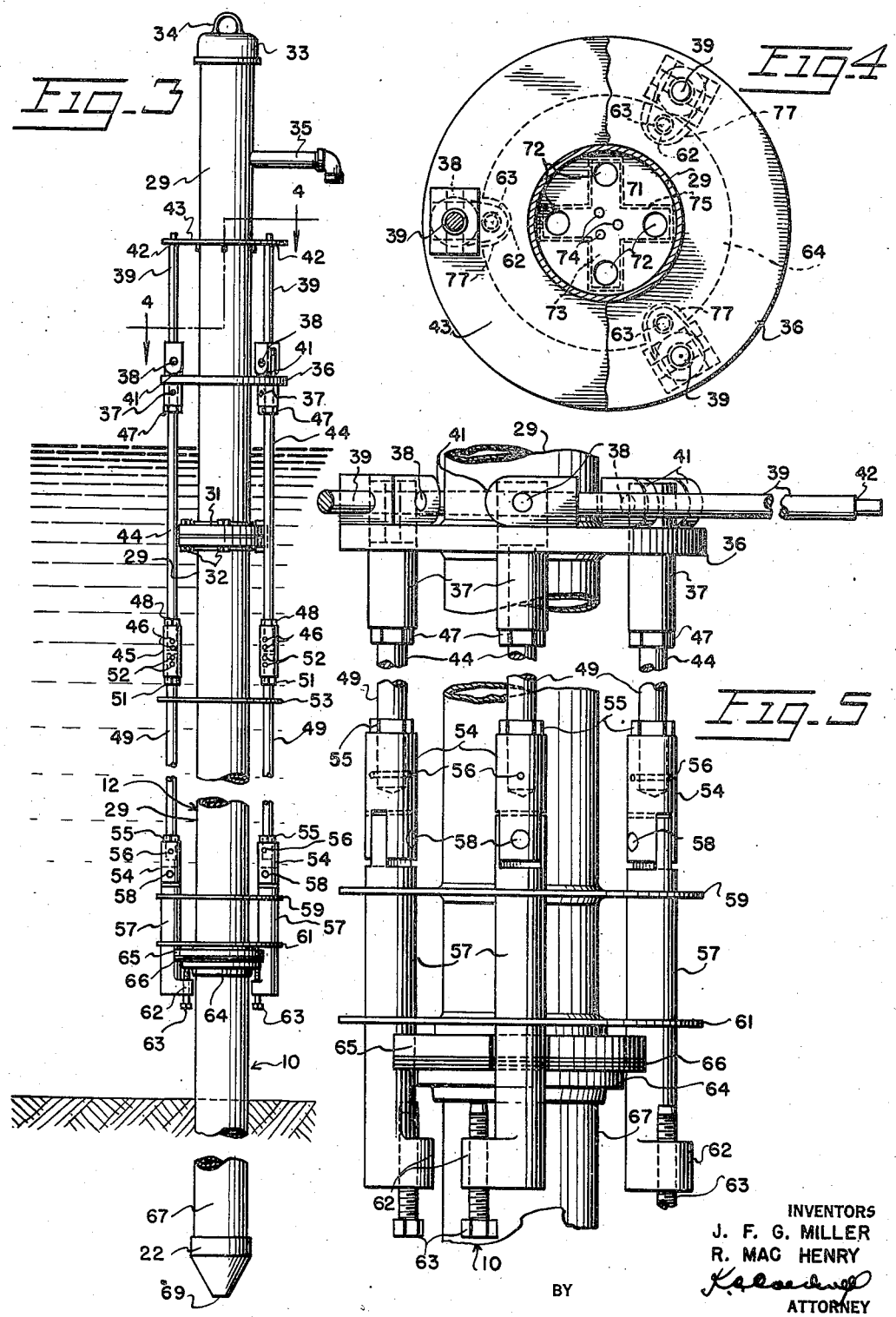

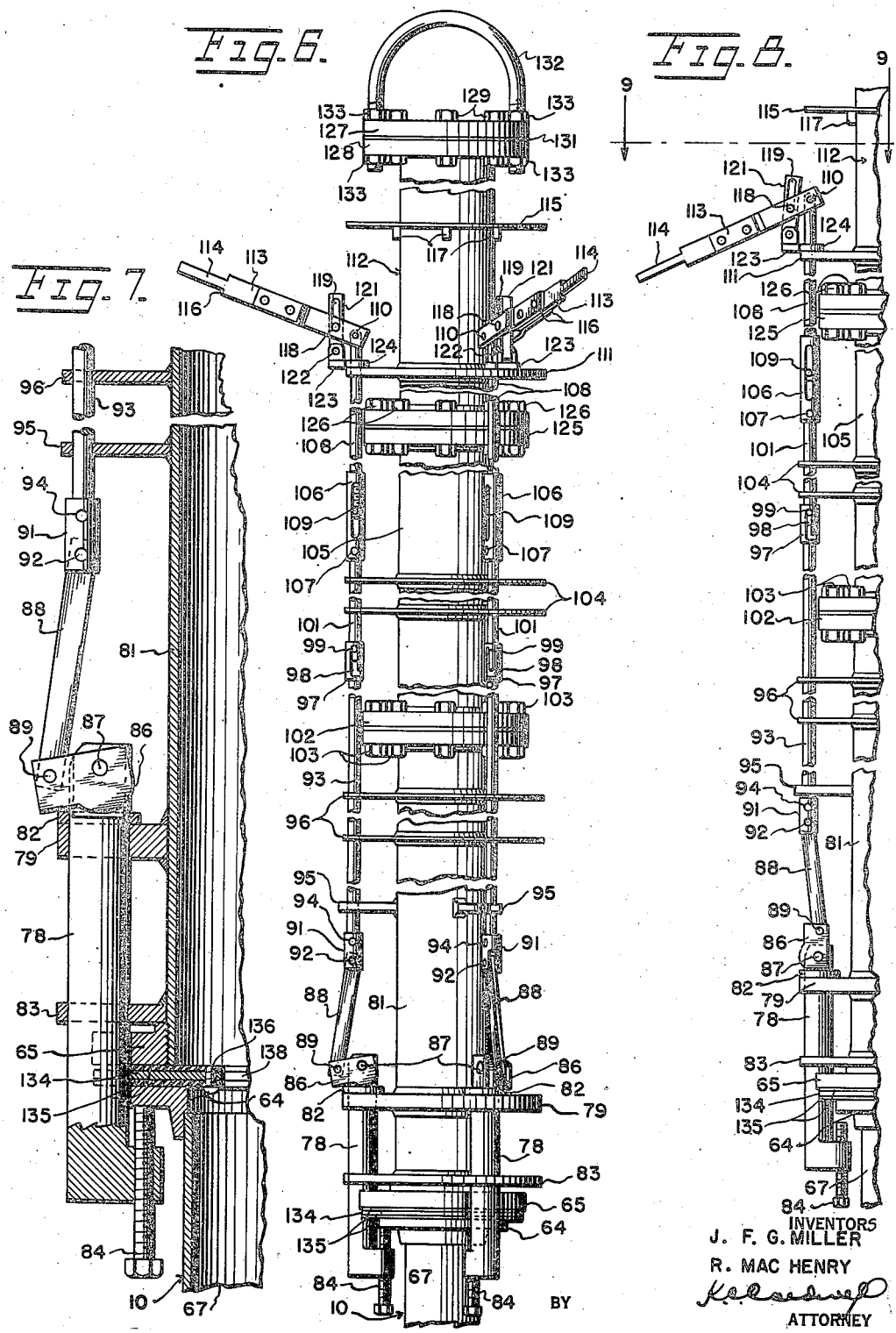

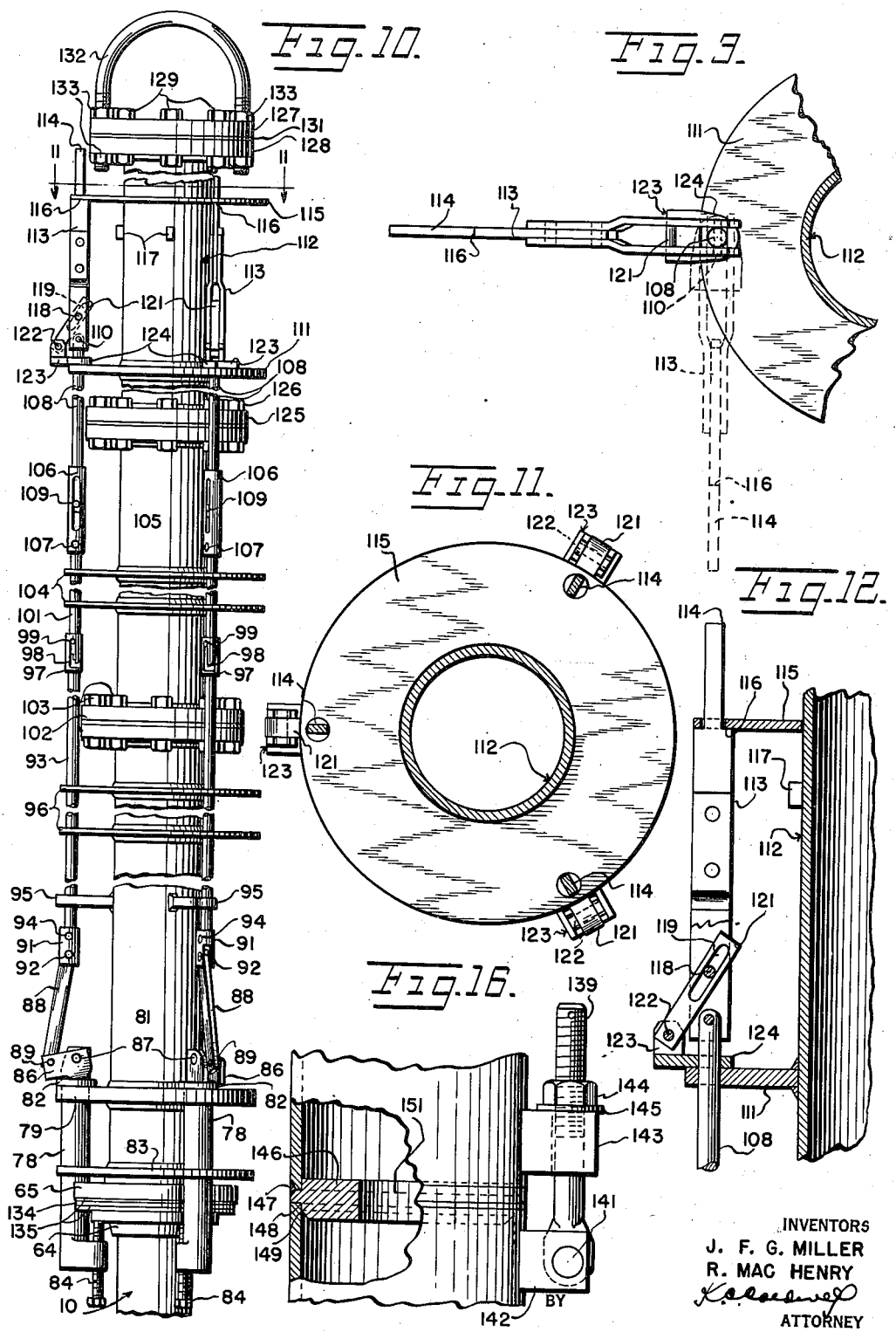

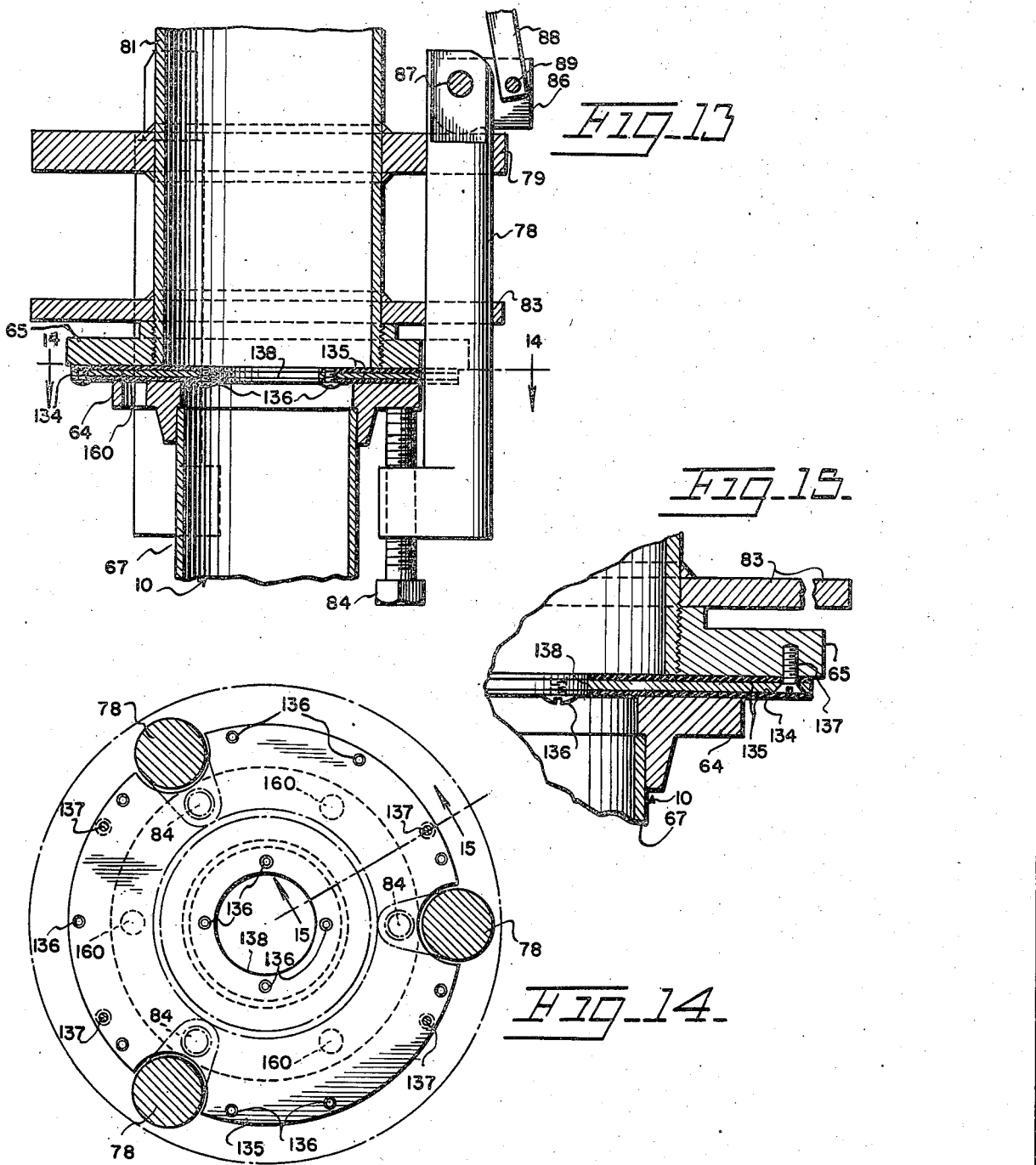

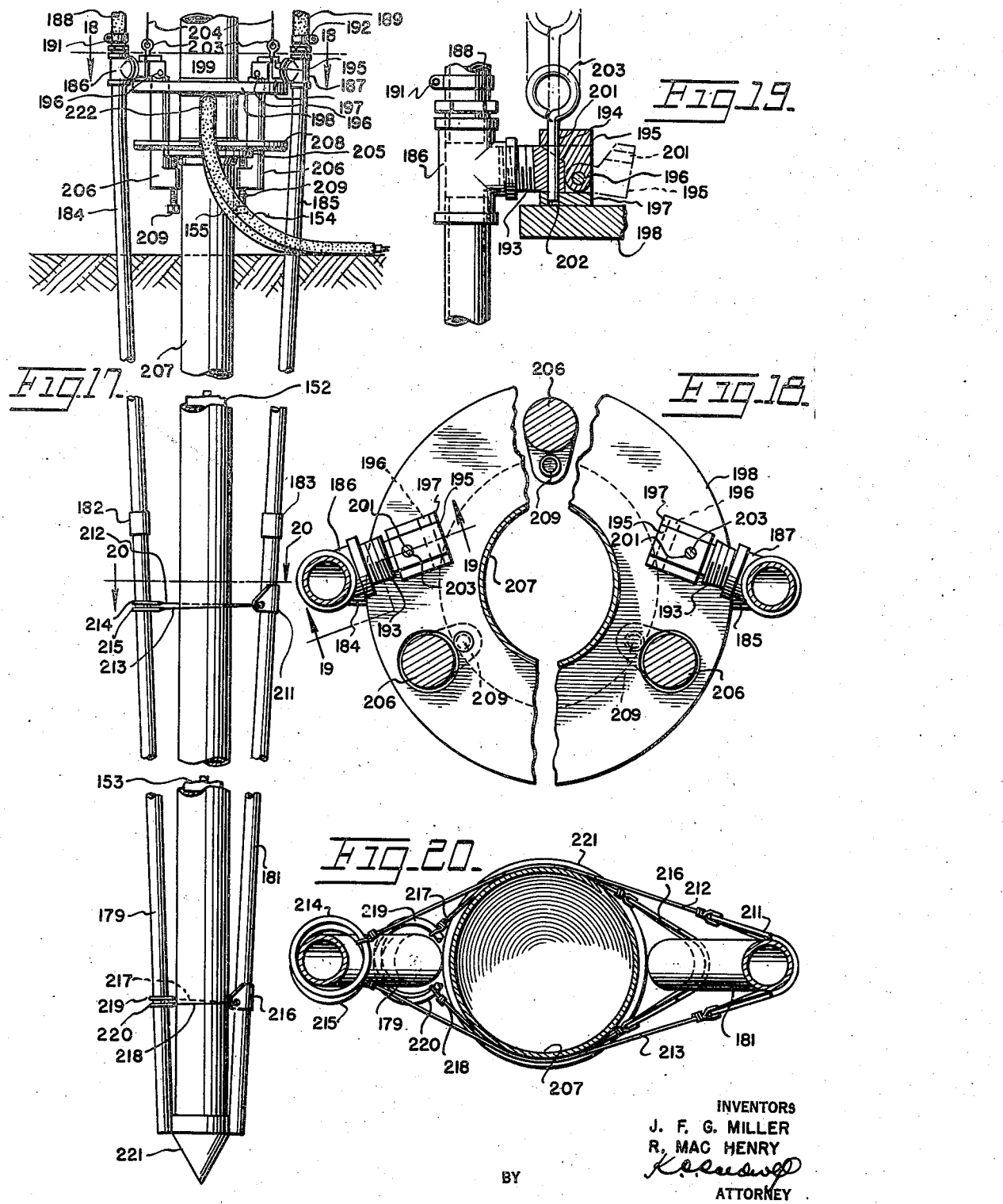

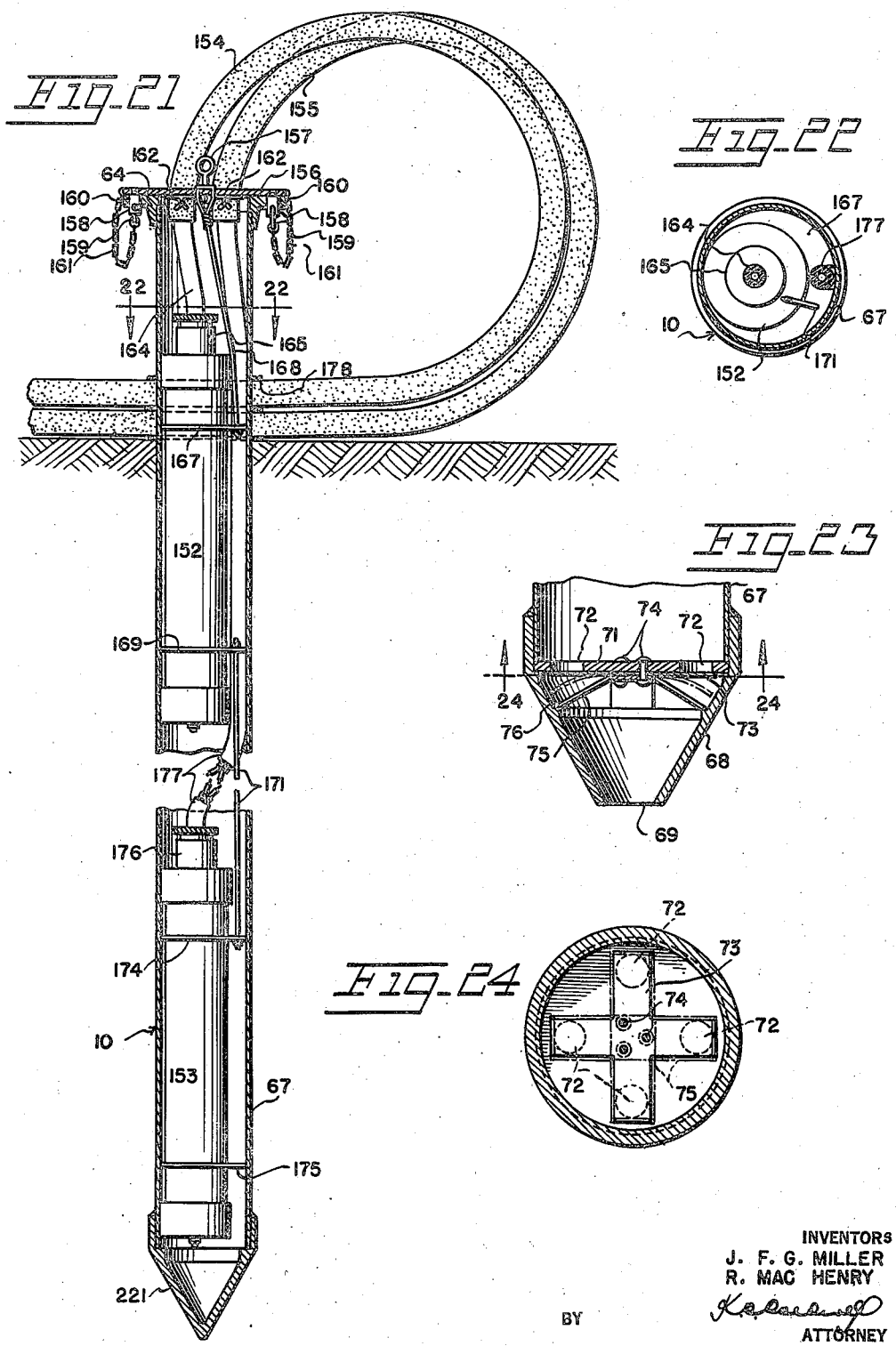

2,405,595

UNITED STATES PATENT OFFICE 2,405,595

MEANS FOR INSTALLING MAGNETIC DETECTING DEVICES AND SUPPORTS THEREFOR

Joseph F. G. Miller, South Arlington, Va., and Richard MacHenry, Washington, D. C.

Application February 3, 1942, Serial No. 429,410

14 Claims. (Cl. 61—63)

(Granted under the act of March 3, 1883, as amended April 30, 1928; 370 O. G. 757)

This invention relates to means for installing magnetic detecting devices and the supports therefor in a predetermined exact arrangement on the bed of a body of water for the accurate determination of the magnetic field set up by a vessel. More specifically, the invention relates to means for installing a plurality of search coils or magnetometer devices in a vertical position according to an exact predetermined arrangement or pattern such that the search coils are embedded within the bed of a body of water of sufficient depth to permit the passage or arrangement of a vessel directly above the coils and the magnetic influence of the various portions of the vessel upon the search coils to be accurately determined by means of certain indicating devices located at an observation station and electrically connected to the search coils by means of suitable submarine cables extending therebetween.

It is the general practice to install the search coils or magnetometer devices within lengths of nonmagnetic tubing embedded within the bed of the body of water in such a manner that the coils are arranged at a predetermined depth of submersion within the water with the upper end of the tubing substantially flush with the bed of the water, this arrangement of search coils and supports therefor being referred to hereinafter as a range or magnetometer array. Heretofore when arranging a magnetometer array the usual practice was to bolt or otherwise couple a length of pipe or tubing to the tubing comprising the magnetometer support and employ a diver for disconnecting the magnetometer support from the first named tube after the magnetometer support had been arranged in a vertical position within the bed of the body of water. Such an arrangement obviously possesses several disadvantages, as will be readily understood, chief among which are the loss of time required for the diver to descend to the bed of the water and to effect the necessary disconnection between the magnetometer support and the length of tubing. Furthermore, after the magnetometer supports have been installed within the bed of the water, the services of the diver are again required to arrange the magnetometer within the support, thereby consuming a considerable amount of valuable time, particularly when a state of national emergency exists in which the steps necessary to the defense of the country must be taken quickly and the defense work must be done in an efficient manner and with a minimum amount of effort.

The present invention contemplates the provision of a magnetometer installing or jetting tool comprising a tubular member preferably of length somewhat greater than the depth of the water within which the magnetometer support is to be installed having a cap at the upper end thereof to which is affixed a support by means of which the tubular member may be raised and lowered at will by a derrick mounted on a barge or vessel. The tubular member is provided with a flange at the lower end thereof adapted to be releasably clamped to a complementary flanged portion of the tubular member employed for mounting the magnetometer coils, the magnetometer mounting tube being clamped to the aforesaid tubular member by a plurality of clamping devices adapted to be released by a suitable cam and lever arrangement located sufficiently near the upper end of the tubular member to be above the level of the water when the magnetometer support is embedded within the bed of the water.

The lower end of the magnetometer support terminates preferably in a tapered fitting or cap having an aperture in the central portion thereof adapted to permit the flow of water therethrough in response to the operation of a water pump arranged on the vessel and having the outlet end thereof operatively connected to the tubular member by a length of flexible tubing. An arrangement is thus provided in which water is forced under pressure by the aforesaid pump into the tubular member and thence through the outlet in the lowermost end of the magnetometer support whereby the weight of the jetting tool is usually sufficient to cause the magnetometer support to be embedded in a predetermined vertical position within the bed of the water at any desired depth without the exercise of mechanical energy other than the flow of the water under pressure through the end thereof.

When the magnetometer support has been set in a predetermined location to a desired depth within the body of water, the release levers at the upper end of the tubular support are moved to the release position thereby disconnecting the tubular member from the magnetometer support whereby the tubular member may be raised by the aforesaid derrick and attached to another of the magnetometer supports with a minimum of delay and without the services of a submarine diver.

The present invention also contemplates an alternative arrangement in which the magnetometer support may be set in a desired location at a predetermined depth of submersion beneath the surface of the water with the search coils or magnetometer instruments installed within the support prior to embedding the same within the bed of the body of water. It will be understood that when the alternative arrangement is employed a single installing operation is sufficient to set the magnetometer support complete with the magnetometer instrument or search coil in a desired position in which the services of a diver are not required for disconnecting the tubular member from the magnetometer support or for subsequently installing the detecting instrument within the support. When the latter arrangement is employed, the tubular member may comprise, among other elements, a pair of jetting tubes detachably secured to the magnetometer support with their lower extremities substantially in horizontal alignment with the lower end of the magnetometer support and the upper end of each of the tubes connected by a flexible tube or hose extending to a T connection at the valve 18, Fig. 1, in communication with the outlet of the water pump. The operation of the pump causes water to be forced through the aforesaid tubes and thereby excavate the bed of the body of water sufficiently to enable the magnetometer support to be set in a predetermined vertical position quickly, easily and with a high degree of accuracy. It will, of course, be understood that when the arrangement of the outside jets is employed, the lower end of the magnetometer support is fitted with a closed cap, preferably tapered or pointed to facilitate the entrance of the support within the bed of the body of water. After the magnetometer support has been installed within the bed of the water, the jetting tubes and the jetting tool are withdrawn leaving the magnetometer support with the instrument therein embedded within the bed of the water.

One of the objects of the present invention is the provision of new and improved means for arranging a magnetometer in a predetermined position within the bed of a body of water without the assistance of a diver.

Another of the objects is the provision of means for arranging a magnetometer device in a predetermined vertical position within the bed of a body of water from a moored vessel in which the services of a diver are not required.

Another object is to provide means for arranging a magnetometer support in a predetermined vertical position within the bed of a body of water in which the magnetometer instrument is installed within the support prior to the arrangement thereof within the bed of the water.

Another of the objects is the provision of new and improved means for arranging a magnetometer support in an adjusted position within the bed of a body of water by forcing a plurality of jets of water into the path of travel of the support as the support enters the bed of the water and thereafter removing the jetting means from the support while the support is in the adjusted position within the bed.

A further object is the provision of means for detachably securing a magnetometer mounting support to a jetting tool comprising a tubular member in watertight relation thereto whereby jetting water may be forced through the tubular member and the mounting support.

A still further object is the provision of a new and improved jetting tool having a plurality of jetting members detachably secured thereto and releasably connected to a magnetometer support in which an arrangement is provided for releasing the magnetometer support from the surface of the water when the support has been jetted to a predetermined vertical position within the bed of the water.

Still other objects, advantages and improvements will be apparent from the following description taken in connection with the accompanying drawings of which:

Fig. 1 is a diagrammatic view of an arrangement suitable for installing magnetometer supports within the bed of a body of water in accordance with the present invention;

Fig. 2 shows in diagrammatic form a range or magnetometer array;

Fig. 3 is an enlarged view of the device in an assembled position;

Fig. 4 is a view taken along the line 4—4 of Fig. 3;

Fig. 5 is an enlarged detail view partially broken away of the device of Fig. 3 in a release position;

Fig. 6 is a view in elevation partially broken away of an alternative form of the device;

Fig. 7 is an enlarged fragmentary detail view of the clamping mechanism of Fig. 6;

Fig. 8 is an elevational view partially broken away of the device of Fig. 6 in the unclamped position;

Fig. 9 is an enlarged detail sectional view taken along the line 9—9 of Fig. 8 showing the release levers in the released position in dashed outline;

Fig. 10 is an elevational view partly broken away of the device with the release levers thereof in an initial locked position;

Fig. 11 is a view of the release lever locking mechanism taken along the line 11—11 of Fig. 10;

Fig. 12 is an enlarged view partially in section of one of the release levers and associated parts;

Fig. 13 is an enlarged sectional view of a sealing member suitable for use with the present invention;

Fig. 14 is a sectional view taken along the line 14—14 of Fig. 13;

Fig. 15 is a fragmentary view somewhat enlarged taken along the line 15—15 of Fig. 14;

Fig. 16 is a detailed view of an alternative device suitable for clamping together the various pipe sections;

Fig. 17 shows an alternative arrangment for installing a magnetometer array;

Fig. 18 is an enlarged sectional view taken along the line 18—18 of Fig. 17;

Fig. 19 is a detailed sectional view taken along the line 19—19 of Fig. 18;

Fig. 20 is a enlarged sectional view taken along the line 20—20 of Fig. 17;

Fig. 21 is a sectional view of a magnetometer support with the magnetometer or search coils in the assembled position;

Fig. 22 is a view taken along the line 22—22 of Fig. 21;

Fig. 23 is an enlarged sectional view of a nozzle suitable for use with the device of Fig. 3; and Fig. 24 is a detail sectional view taken along the line 24—24 of Fig. 23.

Referring now to the drawings, and more particularly to Fig. 1 thereof there is shown thereon a magnetometer support indicated generally by the numeral 10 adapted to receive a search coil or a pair of magnetometer coils and provided at the upper end thereof with a flanged portion for detachably securing the support to the jetting tool indicated generally by the numeral 12. The jetting tool is adapted to be raised and lowered by the derrick 13 and winch 14 to an upper and lower position indicated on Fig. 1 in broken outline. There is also provided upon the vessel, a pump 15 having the inlet connection thereof in communication with the sea water as by the pipe 16 and the outlet connected as by the pipe 17 to a valve 18, the valve being in communication with the jetting tool 12 as by the flexible hose 19. The pump 15 may be operated in any suitable manner as by an electric motor operatively connected to a source of electrical energy by the conductors within the conduit 21 whereby the pump is caused to force water into the jetting tool 12 variably in accordance with the setting of the valve 18 and thence through an aperture within the cap 22 affixed to the lower end of the magnetometer support thereby providing an arrangement in which the weight of the jetting tool and magnetometer support is sufficient to cause the support to be inserted into the bed of the body of water as the water is forced outward from the aperture within the cap 22, the winch 14 being operated to allow the jetting tool to be lowered into the bed of the water.

On Fig. 2 is shown an array or range comprising a plurality of magnetometers 23 arranged within the bed of a body of water according to an exact predetermined pattern and connected to a plurality of measuring instruments as by the conductors within the cables 24 extending therebetween. There is also shown on Fig. 2 a vessel 25 having a pair of mooring lines 26 thereof attached to suitable anchoring means such, for example, as the piles 27 illustrated. The bow of the vessel is moored as by the anchors 28 in a predetermined position with respect to the range such that the magnetic characteristic of the ship may be measured by the measuring instruments at the observation station, this magnetic characteristic being herein referred to as the ship's magnetic signature.

On Fig. 3 is shown an enlarged view of a simplified form of jetting tool comprising a plurality of lengths of pipe 29 coupled together in any suitable manner as by the coupling 31 and bolts 32, the upper end of the pipe assembly being closed by the cap 33 affixed thereto in any suitable manner as by threading the parts together and having a U shaped portion 34 by means of which the device may be raised or lowered at will. There is also provided a pipe connection 35 through which water is forced within the jetting tool at a predetermined degree of pressure such, for example, as 60 pounds.

Secured to the upper tube 29 in any suitable manner as by brazing or welding the parts together is an annular member 36 adapted to receive and slideably support a plurality of members 37 to which are rotatably secured as by the bearing pins 38 the release levers 39. Each of the release levers is provided with a cam portion 41 adapted to engage the plate or member 36 and allow the members 37 to be moved downward as the release levers are moved to the position shown on Fig. 5. The upper end of each of the release levers is somewhat reduced and provided with a shoulder 42 adapted to be engaged by the annular lock member 43 at suitable apertures therein and prevent outward movement of the levers 39 from the position shown on Fig. 3 until the lock member 43 has been raised above the upper ends of the levers. The lock member 43, it will be understood, is provided with a centrally arranged aperture of sufficient size to enable the member 43 to be raised or lowered at will with respect to the tube 29.

Secured to each of the members 37 in any suitable manner as by threading the parts together is a rod 44 fitted within a complementary recessed portion of a sleeve 45 and secured thereto as by the pins 46, the nuts 47 being provided to prevent movement between the rods 44 and the member 37. There is also provided a nut 48 on each of the rods to prevent movement of the rod with respect to the sleeve 45. Within each of the sleeves 45 is threaded a rod 49 and locked thereto as by the nut 51 and pin 52, the rods 49 passing through a bearing plate 53 by means of suitable apertures provided therein, the plate 53 being secured to the lower tube 29 in any suitable manner. The lower end of each of the rods 49 is threaded into a yoke 54 and secured thereto as by the nuts 55 and the pins 56. Each of the yokes 54 is rotatably connected to a clamping member 57 as by the pins 58, the pair of bearing plates 59 and 61 being secured to the lower tube 29 and provided with suitable apertures for slideably and rotatably supporting the clamping members 57. Each of the clamping members 57 is provided with an arm 62 within which is threaded the clamping bolt 63 whereby the flange 64 affixed to the upper end of the magnetometer support 10 may be securely clamped to the flanged portion 65 of the lower tube 29, a suitable gasket 66 being inserted therebetween to insure a watertight connection when the parts are clamped together.

The magnetometer support 10 comprises a tube 67 of nonmagnetic material such, for example, as brass, copper, phosphor-bronze or the like having a cap 22 affixed to the lower end thereof in any suitable manner as by brazing or welding the parts together. The cap is provided with an aperture 69 in the lower portion thereof, Fig. 23, through which water is expelled from the jetting device. The lower end of the tube 67 is provided with a plate 71, Fig. 23, having a plurality of apertures 72 therein adapted to be closed by the resilient member 73 affixed thereto as by the rivets 74, a stop member 75 being provided to prevent movement of the resilient members beyond a predetermined position as water is forced through the apertures 72. A shoulder 76 is provided preferably within the cap 22 in registered engagement with the stop member 75 thereby to prevent movement of the stop member as the resilient member is forced thereagainst by the pressure of the water flowing through the apertures 72. An arrangement is thus provided in which water is allowed to flow from the jet or nozzle 69 but the return flow of water and mud therethrough is prevented by the member 73 when the pressure is removed from the jetting tool 12.

The magnetometer support 10 is adapted to be released from the jetting tool 12 by rotating the release levers 39 to the position shown on Fig. 5 by reason of a recessed portion 77 provided within the flange 64 secured to the magnetometer support 10 whereby the jetting tool may be withdrawn after the magnetometer support has been placed in position within the bed of the body of water.

On Fig. 6 is shown an alternative form of the device of the present invention in which the cam members employed for releasing the clamps 78 are adapted to coact with an annular member 79 secured to the lower tube 81 of the jetting tool, a suitable washer 82 being arranged preferably between the cam member and the member 79. The annular member 79 is provided with suitable apertures therein adapted slideably and rotatably to support the clamps 78, the clamps being additionally supported by the bearing plate 83 affixed to the tubular member 81. The clamp is provided with a bolt 84 adapted to clamp the magnetometer support 10 securely to the flange 65 when the cam 86 is in the position illustrated on Figs. 6 and 7. Each of the cam members 86 is rotatably mounted on the clamps 78 as at 87 and connected with a pull rod 88 by the pin or bolt 89. The upper end of the pull rod is rotatably connected to the coupling 91 by the bearing pin 92, the coupling being secured to the rod 93 in any suitable manner as by the pin 94. The rod 93 is rotatably and slideably supported by the bearing support 95 secured in any suitable manner to the tubular member 81 as by welding or brazing the parts together and additionally supported by the annular members 96 secured to the tubular member 81. The upper end of the rod 93 is welded or otherwise secured to a coupling 97 having a bayonet slot 98 therein adapted to receive the pin 99 secured to the rod 101 whereby the jetting tool is adapted to be partially disassembled for the purpose of more conveniently transporting the same by disconnecting the coupling 102 at the bolts 103 thereof and disconnecting the rods 93 from the rods 101 by the bayonet connection provided therebetween. The rods 101 are slideably and rotatably supported by the bearing plates 104 secured to the tubular member 105, the upper end of the rods being threaded preferably into a turnbuckle 106 and prevented from rotating with respect thereto by reason of the pin 107 passing through the turnbuckle and the rod 101.

The upper end of the turnbuckle is threaded preferably into a rod 108 and prevented from rotating with respect thereto by a pin 109 passing through the rod 108 and the slots within the turnbuckle. An arrangement is thus provided in which the rod 108 may be adjusted with respect to the rod 101 and maintained in the adjusted position by the pin 109. Furthermore, by reason of the employment of couplings such as the couplings 97 and turnbuckles such as the turnbuckles 106 illustrated, the length of the members connecting the release levers 113 with the clamp members 78 may be varied at will by providing a greater or lesser number of rods such as the rods 108, 101 and 93 or by interchanging the rods with rods of different lengths whereby the jetting tool is adapted to be employed for installing magnetometer supports in the bed of a body of water in which the magnetometer arrays may be arranged in different depths of the water. When employed for arranging a magnetometer array within the bed of bodies of water of different depths the number of tubular sections 112, 105 and 81 may be varied at will by reason of the coupling arrangement provided between the sections, or sections of tubing of different lengths may be employed to adapt the jetting tool for the more convenient use thereof with bodies of water of greater or lesser depth according to the location of the range or magnetometer array therein.

Whereas in Fig. 3 the jetting tool comprises two lengths of tubing coupled together and suitable for use with relatively shallow water and the arrangement of Fig. 10 shows a jetting tool comprising three lengths of tubing coupled together adapted for use in somewhat deeper water, it will be understood that, when employed for arranging a magnetometer array within the bed of a body of water of still greater depth, the jetting tool may comprise additional lengths of tubing and pull rods or tubing and pull rods of different lengths in accordance with the depth of the water within which the magnetometers and supports are arranged.

The upper end of the rod 108 passes through the bearing plate 111 secured to the tubular member 112, the plate 111 having a plurality of apertures therein adapted slideably and rotatably to support the rods 108. The upper end of the rod 108 is secured to the release lever 113 as by the pin or bolt 110 whereby the release lever may be rotated both vertically and horizontally thereby to release the magnetometer support 10 from the jetting tool. The upper end 114 of the release lever 113 is preferably somewhat reduced in size and adapted to be locked in a vertical position, Fig. 10, by the locking annular member 115 having a plurality of apertures therein adapted to receive the end 114 of the release lever, the locking ring 115 preferably resting against a shoulder 116 on the release lever when the release lever is in the locked position. The release ring 115 is slideably supported by the tubular member 112 and adapted to be arrested in the downward movement thereof by the stops 117 affixed to the tubular member 112, when the release levers are in the unlocked position.

The release levers are provided with a pin or rod 118 passing therethrough disposed within a slotted portion 119 of a bar 121 rotatably mounted as at 122 by the support 123. The support 123 has a laterally extending portion 124 having an aperture therein within which the shaft or rod 108 is adapted to slide. The tubular member 112 is detachably secured to the tubular member 105 in any suitable manner as by the coupling 125 and bolts 126, the upper end of the member 112 being closed as by the plate or cap 127 secured to the flange 128 as by the bolts 129 and sealed thereto by a gasket 131 arranged between the cap 127 and the flange 128. A U shaped rod 132 having a plurality of nuts 133 thereon additionally clamps the cap 127 to the flange 128 and provides an arrangement by means of which the jetting tool may be raised or lowered at will. The tubular member 112, it will be understood, is provided with a nipple or pipe similar to the pipe 35, Fig. 3, disposed preferably between the stops 117 and the flange 128 thereof by means of which water is forced under pressure into the jetting tool.

There is also provided preferably between the flange 64 secured to the upper end of the magnetometer support 10 and the flange 65, a gasket suitable for the purpose such, for example, as the gasket illustrated on Figs. 13, 14 and 15. Referring now to Fig. 13 on which is shown a detailed view in section of a preferred form of gasket suitable for use with the present invention, an annular member 134 composed of material suitable for the purpose, such as brass, copper or the like is arranged between two annular members 135 of suitable gasket material such, for example, as rubber, leather, fiber or the like held together as by the screws 136 and secured to the flange 65 as by the screws 137 whereby the gasket may be retrieved as the jetting tool is removed from the magnetometer support after the same has been jetted into position within the bed of the water. The gasket, it will be understood, is provided with a sizable aperture 138 adapted to allow the flow of water therethrough during the jetting operation.

In operation the magnetometer support 10 is clamped to the jetting tool by the bolts 84, the cam 86 and the release levers 113 being in the position illustrated on Fig. 10, and the device is lowered to the desired location by the derrick 13. A stream of water is forced through the aperture 69 of the nozzle affixed to the lower end of the magnetometer support when the magnetometer support and jetting tool are lowered, until the magnetometer support has been inserted a predetermined distance within the bed of the water. The flow of water is interrupted as by closing the valve 18, Fig. 1 or stopping the pump 15, as the case may be, the valve 18, it will be understood, having been previously opened a predetermined amount in accordance with the flow of water required to effect the desired jetting operation. The locking ring 115 is now raised clear of the release levers by an operator stationed, for example, in a small boat adjacent the jetting tool and the release levers are moved to the position shown on Fig. 6 of the drawings in readiness to effect the unclamping operation.

As the levers are moved to the position illustrated on Fig. 8 of the drawings, the pin 118 thereof provides a fulcrum by reason of the engagement of the same with the lower portion of the slot within the member 121 and as the lever is additionally moved downward the pin 119 thereof is caused to move upward thereby raising the rod assembly and rotating the cam 86 to the position shown on Fig. 8. When this occurs the clamp 78 is caused to move downward such that the bolt 84 thereof is disengaged from the flange 64. The release lever 113 is now moved to the position indicated in dashed outline on Fig. 9 thereby causing the rod assembly and the clamp 78 to be rotated through an angular distance of substantially 90 degrees and thus move the bolt 84 and supporting arm therefor away from suitable recessed portions provided within the flange 65 sufficiently to enable the jetting tool to be withdrawn from the magnetometer support. Whereas in the alternative form of the invention shown on Figs. 3 and 6, the tubular sections of the jetting tool are detachably secured together by a conventional form of coupling, it will be understood that various other means and instrumentalities therefor may be provided such, for example, as the arrangement shown on Fig. 16 in which the sections of tubing are held together by a plurality of bolts or studs 139 rotatably secured, as by the pins or bolts 141, to the supports 142 attached to one of the tubular sections. Attached to the other tubular section is a support 143 having a recessed portion therein adapted to receive the bolt 139 whereby the tubular members may be clamped together by the nut 144 threaded on the stud 139, a washer 145 being provided preferably between the nut and the member 143.

A metal insert 146 is fitted within the end of one of the tubular members and preferably welded or brazed thereto as at 147, the insert being provided with a shoulder 148 adapted to engage the end of the other of the tubular members as the tubular members are clamped together by the bolts 139. The member 146 also includes a circular portion 149 adapted to engage the inner cylindrical portion of the other of the clamped members in closely fitted relation thereby to insure a watertight joint as the members are clamped together. A suitable aperture 151 is provided within the member 146 to permit the flow of water therethrough.

When the magnetometer support 10 has been placed in position within the bed of a body of water by the jetting tool of Fig. 3 or 6, as the case may be, a search coil or a pair of magnetometer coils is inserted within each of the magnetometer supports by a diver and an electrical connection between the search coils or magnetometer coils is established to a plurality of indicating or measuring instruments by means of submarine cables connected to the magnetometers or to the search coils, as the case may be.

On Fig. 21 is shown a pair of search coils disposed within the casings 152 and 153 respectively, each of the coils having a plurality of electrical conductors arranged within the cables 154 and 155 respectively. In the arrangement shown on Fig. 21 the cables 154 and 155 pass through a cover or plate 156 having an eye bolt 157 therein by means of which the magnetometers may be lowered to the diver. The cover 156 is also provided with a pair of downwardly projecting pins 158 adapted to pass through suitable apertures 160 within the upper flange secured to the magnetometer support 10, each of the pins 158 being provided preferably with an aperture adapted to receive the hooks 159 affixed to the chains 161 and thus lock the cover 156 to the magnetometer support when the hooks are placed within the pins 158. The other end of each of the chains 161 may, if desired, be secured in any suitable manner to the plate 156.

The cables 154 and 155 are secured preferably to the plate 156 in any suitable manner as by a brass or copper wire 162 wrapped about the cables beneath the plate 156. The cable 154 comprises a flexible rubber core 164 passing through a suitable water stop or gland indicated generally at 65 secured to the upper end of a tubular casing 152 of nonmagnetic material such, for example, as brass, copper or the like whereby water is prevented from leaking or seeping within the casing 152. About the casing 152 and secured thereto in any suitable manner is an annular member 167 adapted to slide freely within the magnetometer support and provided with a rod 168 secured in any suitable manner to the plate 167, the upper end of the rod being secured to the cap 156 in any suitable manner such, for example, as the manner illustrated.

There is also secured to the casing 152 an annular member 169 adapted to slide freely within the magnetometer support 10 and having an aperture therein adapted to receive the wire or rod 171 whereby the casing 153 is supported during the assembly of the instrument and thereafter within the magnetometer support by the rod 171 attached in any suitable manner to the plates 169 and 174 secured to the casings 152 and 153 respectively. The casing 153 is also provided with an annular member 175 secured thereto and adapted to slide freely within the magnetometer support whereby the casing 153 is maintained in a predetermined vertical position within the support. The casing 153 is also provided with a water gland or stop 176 within which is disposed the rubber core 177 in the manner generally similar to the arrangement of the rubber core 164 within the gland 165. Within each of the casings 152 and 153 is arranged a search or magnetometer coil comprising a large number of turns of fine wire wound about a rod composed of iron or a material known in the art as Permalloy having a composition of substantially 87½% iron and 12½% nickel. It has also been found desirable to lash the cables 154 and 155 to the magnetometer support generally in the manner of Fig. 21 by means of a suitable cord or nonmagnetic wire 178 thereby to maintain the cables 154 and 155 in close proximity to the bed of the body of water and prevent damage thereto as a result of tidal currents or other disturbances of the water.

On Fig. 17 is disclosed an alternative arrangement in which the jetting is accomplished by two pipes or tubes 179 and 181 provided with couplings 182 and 183 for attachment to the pipes 184 and 185 respectively. The pipes 184 and 185 are provided with a T 186 and 187 respectively to which is secured the flexible pressure tubes 188 and 189 as by the hose clamps 191 and 192. As more clearly shown on Fig. 19 the T 186 is provided with a plug 193 having a tapered portion 194 thereon adapted to coact with the complementary tapered portion of a member 195 rotatably mounted as at 196 to the support 197 secured to a circular flange 198, the flange 199 being secured to the lower portion of the jetting tool 199 in any well known manner. There is provided within the member 195 an aperture 201 adapted to be brought into alignment with an aperture within the plug 193 when the plug is in alignment with an aperture 202 within the support 197 whereby a pin 203 may be inserted through the member 195, the plug 193 and into the support 197 thus providing an arrangement for detachably supporting the jetting tool by the plate 198. The pin 203 associated with each of the jetting tubes is preferably formed at the upper end thereof into an eye to which is attached a cord or wire 204 adapted to be withdrawn from above the surface of the water after the jetting operation has been completed and thereby release the jetting tubes from the plate 198.

The gradiometer support 207 may be generally similar to the support shown on Fig. 21 and provided with a pair of magnetometer or search coils such, for example, as the coils 152 and 153 of Fig. 21 having a pair of cables 154 and 155 extending therefrom and passing through a suitable cap 205 secured to the upper portion of the magnetometer support. The clamps 206 are generally similar to the clamps 78 of Fig. 6, and are rotatably and slideably supported by the bearing members 198 and 208 affixed in any suitable manner to the tubing of the jetting tool, the clamps being adapted to be released by release levers either in the manner of Fig. 3 or Fig. 6. A clamping bolt 209 is provided in each of the clamp members 206 for maintaining the magnetometer support in sealed relation to the jetting tool during the jetting operation.

Secured to the jetting tube 181 in any suitable manner as by brazing or welding the parts together is a strap member or bracket 211 having an aperture in each end thereof to which are secured the flexible rods 212 and 213. The rods 212 and 213 have attached thereto the rings 214 and 215 respectively of sufficient size to permit the tube 179 to slide easily through the rings. There is also secured to the tube 181 a strap member or bracket 216 having apertures therein to which are attached the flexible rods or wires 217 and 218 of somewhat shorter length than the rods 212 and 213, a ring 219 being affixed to the end of the rod 217 and a ring 220 being similarly affixed to the end of the rod 218. An arrangement is thus provided in which, by arranging the tube 179 within the rings 214, 215, 219 and 220 in the manner illustrated on Figs. 17 and 20, the jetting tubes 179 and 181 are releasably secured to the magnetometer support 207 in such a manner that the lower ends of the jetting tubes are maintained adjacent the lower end of the magnetometer support and on opposite sides thereof during the jetting operation. It will, of course, be understood that when the arrangement of Fig. 17 is employed the magnetometer support is provided with a tapered end or cap 221 to prevent the entrance of mud and silt within the magnetometer support as water is forced under pressure through the jetting tubes 179 and 181.

When the magnetometer or search coils 152 and 153 and the support 207 therefor have been jetted to a predetermined vertical position within the bed of a body of water, the flow of water through the tubes 179 and 181 is interrupted by closing the valve 18, Fig. 1 or by stopping the pump 15, as the case may be, and the pin 203 associated with the jetting tube 179 is withdrawn thereby disconnecting the upper end of the jetting tube 179 from the plate 198 of the jetting tool. The tube 179 is now withdrawn by the hose 188 or, if desired, by hauling in or pulling upward on a line or cable secured to the tube 184 or the T connection 186. As the T and jetting tube move upward, the inclined portion 194 of the plug member 193 causes the latch 195 to be moved to the position shown in dashed outline on Fig. 19. As the jetting tube 179 moves upward, the rings 219 and 220 are released and, as the tube 179 continues its movement upward, the rings 214 and 215 are released. The pin 203 associated with the jetting tube 181 is now removed and the tube 181 may be withdrawn together with the flexible rods or wires 212, 213, 217 and 218 and the rings attached thereto.

The clamps 206 are now operated to the release position by means of the release levers provided at the upper end of the jetting tool and the jetting tool is withdrawn as by the aforesaid derrick. The lower end of the jetting tool, it will be noted, is provided with a slot 222 extending to the lowermost end of the tube 199 and continuing through the annular member 208 connected thereto whereby the cables 154 and 155 and the magnetometer or search coils 152 and 153 attached thereto are not disturbed as the tube member 199 is withdrawn.

Briefly stated in summary, the present invention provides an arrangement in which the installation of magnetic detecting devices in predetermined positions within the bed of a body of water may be accomplished quickly, economically and with a high degree of accuracy and in which, if desired, the services of a submarine diver are not required, either in connection with the installation of the supports for the devices or for arranging the magnetic detecting devices within the supports.

While there are shown and described herein certain preferred examples of the invention which give satisfactory results, it is to be understood that this has been done for purposes of disclosure and that many other and varied forms and uses will present themselves to those versed in the art without departing from the invention, and the invention, therefore, is not limited either in structure or in use except as indicated by the terms and scope of the appended claims.

The invention herein described and claimed may be manufactured and used by and for the Government of the United States of America for governmental purposes without the payment of any royalties thereon or therefor.

What is claimed as new and desired to be secured by Letters Patent of the United States is:

1. A device of the character disclosed for arranging a magnetometer support within the bed of a body of water, said support having an aperture therein, the combination of a tubular member sealed at the upper end thereof and having a water inlet connected thereto, means for detachably securing said support in sealed relation to said tubular member, means for forcing water through said inlet and through said aperture within the support thereby to cause the support to be embedded within the bed of said body of water to a predetermined depth with the axis of the support vertical, and means operable at will from the surface of the water for detaching the tubular member from said support without disturbing the axis of the support from the vertical or changing the depth to which the support has been embedded within said bed.

2. In a device for installing a magnetometer support within the bed of a body of water, said support having an aperture at the lower extremity thereof, the combination of an installing tool, means for detachably securing said installing tool to said magnetometer support, means for causing water to flow from the installing tool through the aperture within said support while the support is resting on the bed of said body of water thereby to cause the support to be set vertically to a predetermined depth within said bed, means for arresting the flow of water from said installing tool and said aperture when the support has been set vertically at said predetermined depth within the bed, and means adapted to be controlled from the surface of the water for disconnecting the installing tool from said magnetometer support without disturbing the setting of the support within the bed.

3. A jetting tool for the installation of a tubular support within the bed of a body of water, means for releasably clamping the support to said tool, a flexible tube operatively connected to said jetting tool through which water is adapted to flow, means for forcing water through said flexible tube and said tubular support as the support rests on the bed of the body of water thereby to cause the support to enter the bed, means for discontinuing the flow of water when the support is vertical and has entered the bed a predetermined distance, and means operable from the surface of the water for quickly detaching said jetting tool from the tubular support without displacing the support from its position in the bed.

4. In a device of the character disclosed for jetting a tubular support to a vertical position and a predetermined depth within the bed of a body of water, a tubular member having one end thereof adapted to be sealed to said support, means for clamping said support to the tubular member in sealed relation thereto, means for forcing water through said tubular member and the support while the support is in engagement with said bed thereby to cause the support to be jetted to said vertical position and depth within the bed, and means including a plurality of release levers adapted to be operated at the surface of the water for releasing said clamping means without disturbing said support from its position in the bed.

5. In a device of the character disclosed for jetting a tubular support to a vertical position and a predetermined depth within the bed of a body of water, a tubular member having one end adapted to be sealed to said support and a contracted orifice in the other end thereof through which water is adapted to flow, means for clamping said support to the tubular member in sealed relation thereto, means for forcing water through said tubular member and said orifice while the support is in engagement with the bed of said body of water thereby to cause said support to be jetted to said vertical position and depth within said bed, and means including a plurality of release levers and cam devices controlled thereby adapted to be operated at the surface of the water for releasing said clamping means without displacing said support from its position in the bed.

6. In a device of the class described, the combination of a jetting tool comprising a plurality of assembled tubular members, means for assembling said tubular members in alined relation, a flange member secured to one end of the assembled tubular members, a tubular support having an orifice in the lower end thereof, a flange secured to the opposite end of said support adapted to be clamped to the flange member secured to said assembled tubular members, means for clamping said flange to said flange member, means for forcing a stream of water through said tubular members and said orifice thereby to jet the support to a vertical position and a predetermined distance within the bed of a body of water, and means including a plurality of cam devices operable from the surface of the water for releasing said clamping means when the tubular support has been jetted a predetermined distance within said bed without displacing the support from its position.

7. In a device of the class described, the combination of a jetting tool comprising a plurality of lengths of assembled tubing, means for assembling said lengths of tubing in alined relation, a flange member secured to one end of the assembled tubing, a tubular support having a reduced orifice in the lower end thereof through which water is adapted to flow, a flange secured to the opposite end of said support adapted to be clamped to the flange member secured to said assembled tubing, means for clamping said flange to said flange member, means for forcing a stream of water through said assembled tubing and the orifice thereby to jet the support to a predetermined position within the bed of a body of water, means for arresting the flow of said stream of water through said orifice, means including a plurality of cam devices operable from the surface of the water for releasing said clamping means when the tubular support has been jetted a predetermined distance within said bed, and means for checking the return flow of mud and silt through said orifice when said clamping means are released.

8. In a device of the class described, the combination of a tubular member, a tubular support having an aperture in the lower end thereof, means for releasably clamping said support in sealed relation to said tubular member, means for arranging said support and tubular member in a vertical position with the tubular support resting on the bed of a body of water, means for forcing a stream of water through said tubular member and the aperture within said support thereby to cause the support to enter said bed, and means arranged above the surface of said body of water for releasing the clamping means when the support has entered the bed of the body of water to a predetermined depth, without displacing the axis of the support from the vertical position thereof or changing the depth to which the support has entered the bed of the body of water.

9. In a device of the character disclosed for jetting a magnetic detecting device within the bed of a body of water, a tubular support adapted to receive said magnetic detecting device and having a flanged portion at the upper end thereof, a tapered cap having an orifice therein secured to the lower end of said tubular support, a tubular member having a flange at the lower end thereof adapted to engage said flanged portion of the tubular support, a plurality of L shaped clamping members having rotatable cam devices respectively secured thereto adapted to releasably lock the clamping members in a predetermined clamping position, a plurality of means secured to said tubular member for slideably and rotatably supporting said clamping members, a surface on one of said supporting means adapted to coact with said cam devices and releasably maintain said clamping members in said clamping position, a plurality of bolts supported by said clamping members adapted to clamp the flanged portion of said tubular support to the flange of said tubular member in watertight relation therewith, means for forcing water through said tubular member and said orifice while the tubular support is in engagement with said bed, and means controlled from the surface of said body of water for actuating said cam devices to a release position and for thereafter rotating said cam devices and clamping members sufficiently to disengage said tubular member from said tubular support when the tubular support has been jetted a predetermined distance within said bed.

10. A jetting tool of the character disclosed for planting a magnetometer within the bed of a body of water comprising a tubular member sealed at the upper end thereof and having a water inlet connected thereto, a tubular support for said magnetometer adapted to be connected to said tubular member in alined relation thereto, a plurality of devices for releasably clamping said tubular support to said tubular member, a tapered cap having a contracted orifice therein secured to the lower end of said tubular support, means for forcing water through said inlet and said orifice thereby to jet the tubular support to a predetermined position within the bed of the water, a plurality of release levers operatively connected to said clamping devices adapted to be actuated to the released position from the surface of the water, means for locking each of said release levers in a predetermined clamping position thereof, said locking means comprising a movable member slideable with respect to said tubular member and supported thereby, and means including a plurality of rotatable supports respectively associated with each of said release levers for causing said clamping devices to be released by said release levers as the release levers are moved to a released position.

11. A device of the character disclosed for jetting a magnetometer within the bed of a body of water comprising a tubular member, a tubular support for said magnetometer adapted to be clamped to said tubular member, said support having a tapered cap adapted to seal the lower end thereof, means including a plate secured to said tubular member for releasably clamping said support to the tubular member, a pair of jetting tubes releasably secured to said plate and having the lower ends thereof adjacent said tapered cap, a plurality of brackets secured to one of said jetting tubes, each of said brackets having a pair of flexible rods attached thereto adapted to engage said tubular support on opposite sides thereof, an annular member secured to each of said flexible rods adapted to receive and slideably engage the other of said jetting tubes whereby the jetting tubes are maintained in predetermined spaced relation on opposite sides of said tubular support when the other of said jetting tubes is arranged within said annular members, means for forcing water through said jetting tubes thereby to cause the magnetometer support to be jetted within the bed of said body of water, means for releasing said other of the jetting tubes from said plate whereby the tube may be withdrawn from said annular members when the magnetometer support has been jetted within said bed, and means for releasing said one of the jetting tubes from said plate when said other of the jetting tubes has been withdrawn from said annular members.

12. In a device for jetting a tubular support within the bed of a body of water, the combination of a pair of jetting tubes, a jetting tool releasably clamped to said support and adapted to guide the support within the bed of the water, means for releasably securing said tubes to said jetting tool, means for releasably securing said jetting tubes to the support, means for forcing water through said jetting tubes while the support is being guided into said bed by said jetting tool, means for releasing one of said jetting tubes from said jetting tool whereby the jetting tube may be withdrawn from engagement with the support when the support has been jetted in a vertical position to a predetermined position within said bed, means effective as said one of the jetting tubes is withdrawn for releasing the other jetting tube from the support, means for thereafter disengaging said second jetting tube from the jetting tool, and means controlled from the surface of the water for disengaging said jetting tool from said support without displacing said support from its position within said bed.

13. A tool for installing a magnetometer support within the bed of a body of water comprising a tubular member, a clamping mechanism secured to said tubular member adapted to releasably clamp the tubular member to said support, a plurality of jetting tubes releasably secured to said tubular member and said support and adapted to emit a plurality of jets of water into the path of travel of the magnetometer support as the support is jetted into the bed of said body of water, means including a plurality of flexible tubes respectively connected to said jetting tubes for causing said jets of water to be forced from the lower ends of the jetting tubes, a pair of magnetometer coils disposed within said support and having a plurality of submarine cables extending therefrom adapted to establish an external electrical connection to said coils, a cover secured to the upper end of said magnetometer support having an aperture therein through which the submarine cables are adapted to pass, a recessed portion within said tubular member adapted to receive said cables and permit the withdrawal of said tool without disturbing the cables, means controlled from the surface of the water for disengaging said jetting tubes in succession from said tool when the magnetometer support has been jetted within said bed, and means operable from the surface of the water for disengaging the tool from said support when said jetting tubes have been disengaged from said tool.

14. In a device of the character disclosed for installing a magnetometer array within the bed of a body of water, the combination of a tubular member, a tubular magnetometer support having a contracted orifice in the lower end thereof, a flange member secured to the upper end of said support, a complementary flange secured to the lower end of said tubular member adapted to engage said flange member, said complementary flange having a plurality of recessed portions disposed about the periphery thereof, a plurality of L shaped clamping devices arranged within said recessed portions of said flange adapted to clamp the flange securely to said flange member, means secured to said tubular member for slideably and rotatably supporting said clamping devices, a water inlet secured to said tubular member, means for forcing water through said inlet and said contracted orifice thereby to jet the support within said bed, and means including a plurality of levers secured to the upper end of said tubular member for slideably and rotatably actuating said clamping devices to a released position such that the tubular member may be withdrawn from the magnetometer support when the support has been jetted to a predetermined position within said bed.

JOSEPH F. G. MILLER.
RICHARD MacHENRY.